(12) United States Patent
Lee et al.

(10) Patent No.: US 9,070,194 B2
(45) Date of Patent: Jun. 30, 2015

(54) PLANAR SURFACE DETECTION

(71) Applicants: Kyungsuk David Lee, Bellevue, WA (US); Alexandru Balan, Redmond, WA (US); Jeffrey N. Margolis, Seattle, WA (US)

(72) Inventors: Kyungsuk David Lee, Bellevue, WA (US); Alexandru Balan, Redmond, WA (US); Jeffrey N. Margolis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 303 days.

(21) Appl. No.: 13/660,948

(22) Filed: Oct. 25, 2012

(65) Prior Publication Data

US 2014/0118397 A1    May 1, 2014

(51) Int. Cl.
*G06T 15/40*    (2011.01)
*G06T 7/00*    (2006.01)

(52) U.S. Cl.
CPC ..... *G06T 7/0057* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,262,738 B1 | 7/2001 | Gibson et al. | |
| 6,714,213 B1 | 3/2004 | Lithicum et al. | |
| 7,023,432 B2 * | 4/2006 | Fletcher et al. | 345/419 |
| 2008/0100588 A1 | 5/2008 | Nogami et al. | |
| 2008/0316203 A1 | 12/2008 | Sandor et al. | |
| 2009/0069096 A1 | 3/2009 | Nishimoto | |
| 2010/0328204 A1 | 12/2010 | Edwards et al. | |
| 2011/0199389 A1 | 8/2011 | Lu et al. | |

OTHER PUBLICATIONS

Chen, Liang-Chien et al., "Reconstruction of Building Models with Curvilinear Boundaries from Laser Scanner and Aerial Imagery", Advances in Image and Video Technology, Dec. 2006, pp. 24-33.
Kjellander, J. A. P. et al., "Planar Segmentation of Data from a Laser Profile Scanner Mounted on an Industrial Robot", The International Journal of Advanced Manufacturing Technology, Feb. 24, 2009, pp. 181-190.
Lee, Tae-kyeong et al., "Indoor Mapping Using Planes Extracted from Noisy RGB-D Sensors", IEEE/RSJ International Conference on Intelligent Robots and Systems, Oct. 2012, pp. 1727-1733.
ISA European Patent Office, Invitation to Pay Additional Fees and, Where Applicable, Protest Fee for International Patent Application No. PCT/US2013/066979, Feb. 7, 2014, 6 pages.
ISA European Patent Office, International Search Report & Written Opinion for PCT/US2013/066979, Jul. 8, 2014, WIPO, 15 Pages.
Soleimani, et al., "Converting every surface to Touchscreen", Retrieved at <<http://ieeexplore.ieee.org/stamp/stamp.jsp?tp=&rnumber=6121587>>, MVIP '11, Nov. 16, 2011, pp. 1-5.
Tang, et al., "Real time Virtual View Generation for Augmented Virtuality System", Retrieved at <<https://academypublisher.com/~academz3/ojs/index.php/jcp/article/viewFile/0605873880/2983>>, Journal of Computers '11, vol. 6, No. 5, May 2011, pp. 873-880.

* cited by examiner

*Primary Examiner* — Ryan R Yang
(74) *Attorney, Agent, or Firm* — Steve Wight; Judy Yee; Micky Minhas

(57) ABSTRACT

A planar surface within a physical environment is detected enabling presentation of a graphical user interface overlaying the planar surface. Detection of planar surfaces may be performed, in one example, by obtaining a collection of three-dimensional surface points of a physical environment imaged via an optical sensor subsystem. A plurality of polygon sets of points are sampled within the collection. Each polygon set of points includes three or more localized points of the collection that defines a polygon. Each polygon is classified into one or more groups of polygons having a shared planar characteristic with each other polygon of that group. One or more planar surfaces within the collection are identified such that each planar surface is at least partially defined by a group of polygons containing at least a threshold number of polygons.

19 Claims, 7 Drawing Sheets

PLANAR SURFACE DETECTION

BACKGROUND

Televisions, computer displays, movie screens, and other video monitors provide visual information to users. This visual information may take the form of a graphical user interface that enables a user to interact with a computing system. Conventional video monitors may be limited by a variety of different physical constraints, including the physical size of the monitor and the physical locations at which the monitor may be positioned.

SUMMARY

A planar surface within a physical environment is detected enabling presentation of a graphical user interface overlaying the planar surface. Detection of planar surfaces may be performed, in one example, by obtaining a collection of three-dimensional surface points of a physical environment imaged via an optical sensor subsystem. A plurality of polygon sets of points are sampled within the collection. Each polygon set of points includes three or more localized points of the collection that defines a polygon. Each polygon is classified into one or more groups of polygons having a shared planar characteristic with each other polygon of that group. One or more planar surfaces within the collection are identified such that each planar surface is at least partially defined by a group of polygons containing at least a threshold number of polygons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Detecting and tracking physical objects within a physical environment using optical sensors such as depth, infrared, or visible light cameras enable a compelling user experience. A computing system is able to understand the physical environment through imaging, detection, and tracking of physical objects. In turn, the computing system is enabled to transform any physical surface into a virtual touch screen interface that provides user interaction with virtual content while also enabling the user to experience real-world tactile feedback from the physical surface.

In the field of computer vision, the process of detecting and tracking physical objects may be computationally involved, occupying substantial processing resources or time, making it difficult to achieve acceptable performance in a real-time use setting. The planar surface detection and tracking disclosed herein may achieve improved detection and tracking performance while consuming fewer processing resources. Using optical sensor data, planar surfaces are initially detected within an observed scene, the planar surfaces are refined for greater accuracy, the boundaries of the planar surfaces are resolved, and the planar surfaces are tracked them between frames of optical sensor data.

A GUI may be presented overlaying one or more of the planar surfaces. Foreground objects moving in front of the planar surfaces may be segmented and user input in the form of touch events are detected based on proximity to the planar surfaces. Detected user input may be used to control various aspects of a computing system.

A variety of techniques may be used to present the GUI, including: (1) projecting visible light representing the GUI onto the planar surface, (2) displaying the GUI via a graphical display of a mobile computing device overlaying a camera view of the physical environment, or (3) displaying the GUI via a see-through graphical display of a head-mounted display system. Before addressing the techniques for detecting planar surfaces within the physical environment, an example head-mounted display system for displaying a GUI overlaying a physical environment will be described.

Figure 1:
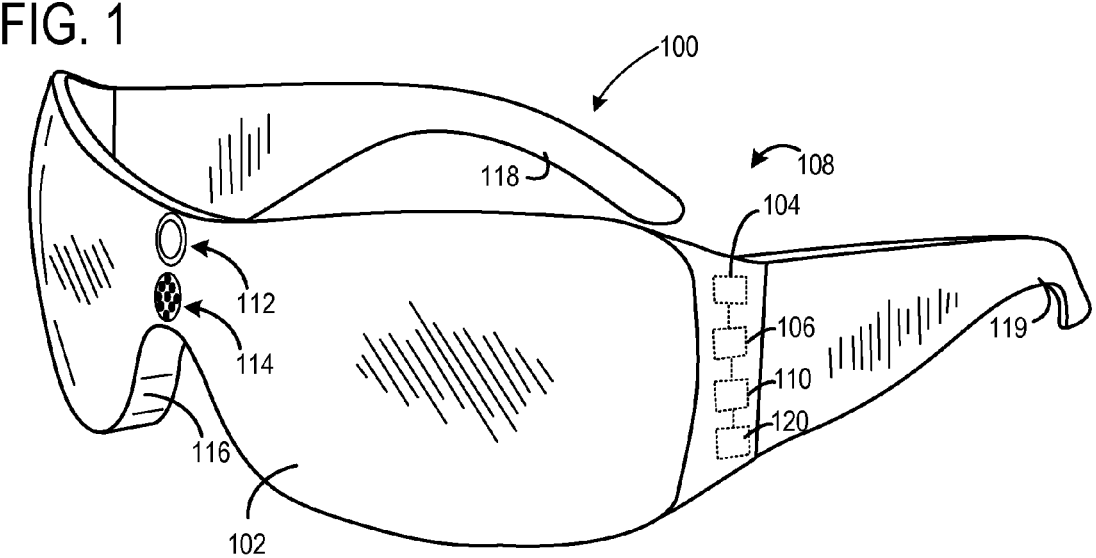
FIG. 1 shows an example head-mounted display system in accordance with an embodiment of the present disclosure.

FIG. 1 shows a nonlimiting example of a head-mounted display system 100 including a see-through graphical display 102. See-through graphical display 102 is at least partially transparent, thus allowing light to pass through the see-through graphical display to the eyes of a user. Furthermore, the see-through graphical display is configured to visually augment an appearance of a physical environment to a user viewing the physical environment through the see-through graphical display. For example, the see-through graphical display may display graphical elements that the user can see when the user looks through the see-through graphical display. As such, the user is able to view the graphical elements that do not exist within the physical environment at the same time that the user views the physical environment. This creates the illusion that the graphical elements are part of the physical environment.

Head-mounted display system 100 also includes a virtual reality engine 104. The virtual reality engine 104 is configured to cause the see-through graphical display to visually present one or more graphical elements. The one or more graphical elements may form a GUI. The GUI can simulate the appearance of a real-world television, computer display, movie screen, and/or other monitor. To a user viewing the physical environment through the see-through graphical display, the GUI appears to be integrated with the physical environment. In this way, the user is able to view a GUI that is not actually present in the physical environment. Virtual reality engine 104 may include software, hardware, firmware, or any combination thereof.

Figure 2:
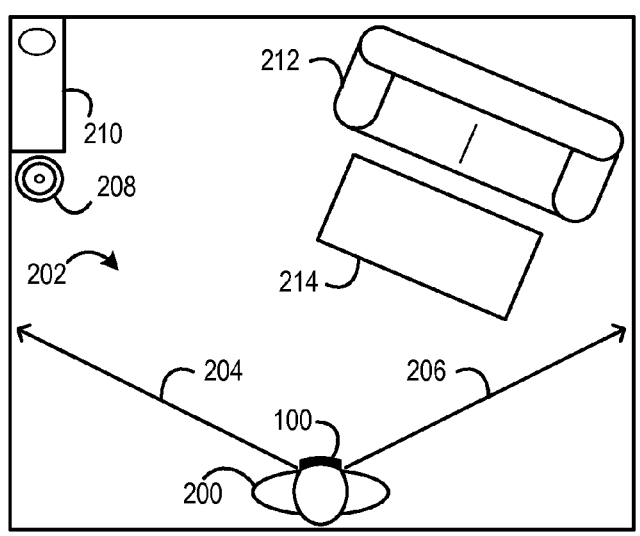
FIG. 2 shows a top view of a user wearing a head-mounted display system in an example physical environment.

FIG. 2 schematically shows a top view of user 200 wearing a head-mounted display system within a physical environment 202. Lines 204 and 206 indicate the field of view of the user through the see-through graphical display of the head-mounted display system. FIG. 2 also shows the real-world objects 208, 210, 212, and 214 within physical environment 202 that are in the field of view of the user 200.

Figure 3:
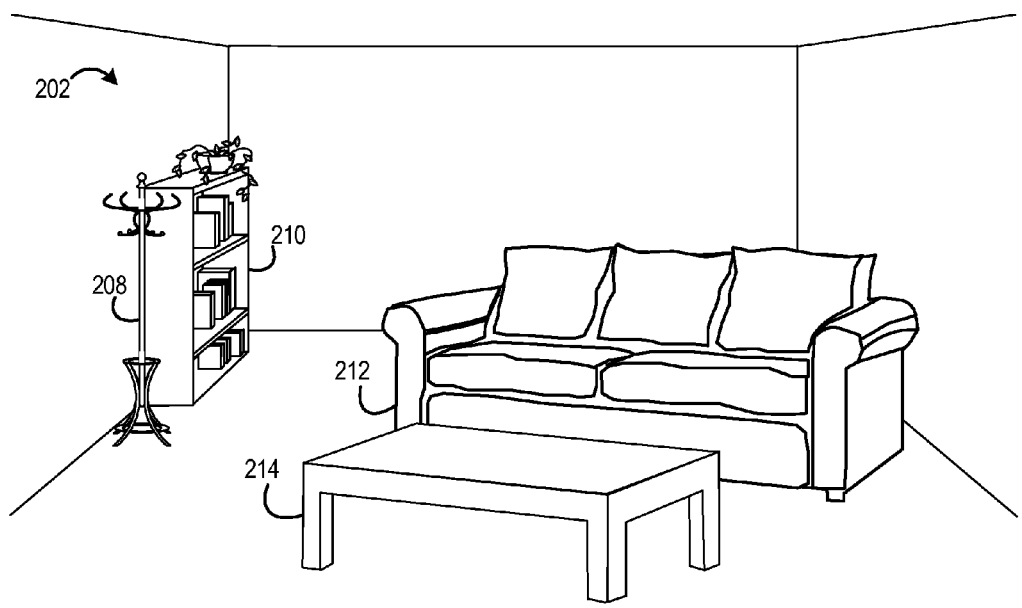
FIG. 3 shows an unaltered first-person perspective of the user of FIG. 2.

FIG. 3 shows a first-person perspective of the user 200 viewing real-world objects 208, 210, 212, and 214 through the head-mounted display system. In FIG. 3, the virtual reality engine of the head-mounted display system is not visually presenting graphical elements or other graphical information. As such, the user is only able to see the real-world objects present within the physical environment. The user sees such real-world objects because light reflecting from the real-world objects is able to pass through the see-through graphical display to the eyes of the user.

Figure 4:
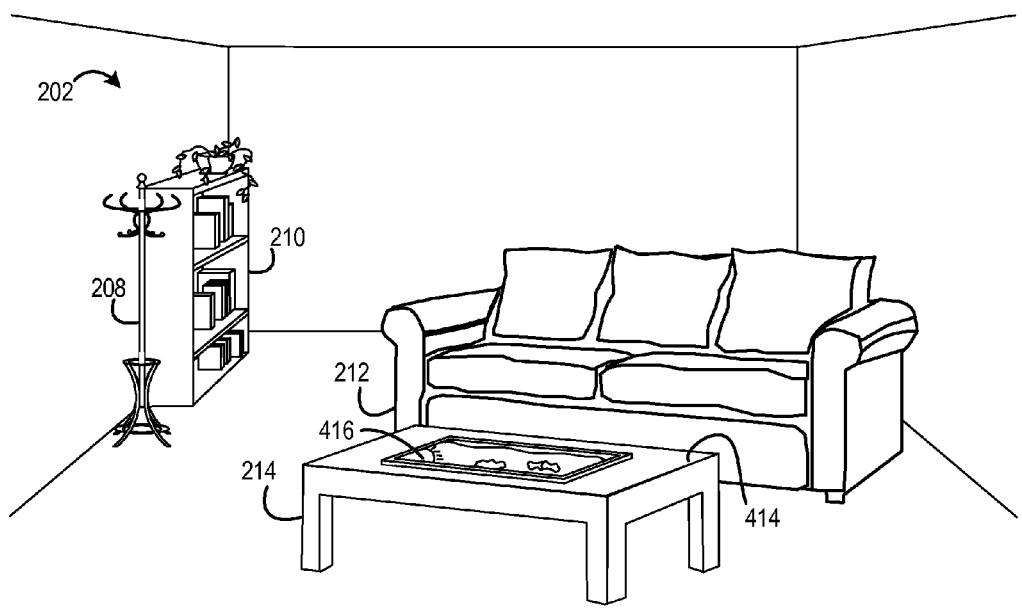
FIG. 4 shows an example first-person perspective of the user of FIG. 2 while the head-mounted display system augments reality to visually present a graphical user interface.

FIG. 4 shows the same first-person perspective of user 200, but with the virtual reality engine visually presenting graphical elements. In particular, the virtual reality engine is visually presenting a GUI 416 overlaying a planar surface 414 of table 214. From the perspective of the user, GUI 416 appears to be integrated with physical environment 202. The appearance of GUI 416 overlaying table surface 414 simulates a conventional tablet computing device. GUI 416 is provided as a nonlimiting example as a GUI may be rendered to have virtually any appearance without departing from the scope of this disclosure.

As one example, a GUI may be playing a video stream of moving or static images. A video stream of moving images may be played at a relatively high frame rate so as to create the illusion of live action. A video stream of static images may present the same image on the virtual monitor for a relatively longer period of time. As a nonlimiting example, a video stream of a photo slideshow may only change images every five seconds. It is to be understood that virtually any frame rate may be used without departing from the scope of this disclosure.

As another example, a GUI may be opaque or partially transparent. An opaque GUI may be rendered so as to occlude real-world objects that appear to be behind the GUI. A partially transparent GUI may be rendered so that real-world objects or other graphical elements can be viewed through the GUI.

As another example, a GUI may be frameless or framed. A frameless GUI may be rendered with an edge-to-edge viewable region that can play a video stream without any other structure rendered around the screen portion. In contrast, a framed GUI may be rendered to include a frame around the viewable region. Such a frame may be rendered so as to resemble the appearance of a conventional television frame, computer display frame, movie screen frame, or the like.

Both frameless and framed GUIs may be rendered without any depth. For example, when viewed from an angle, a depthless GUI will not appear to have any structure behind the surface of the viewable region. Furthermore, both frameless and framed GUIs may be rendered with a depth, such that when viewed from an angle the GUI will appear to occupy space behind the surface of the GUI.

As another example, a GUI may include a rectangular or nonrectangular viewable region. Furthermore, the viewable region may be planar or non-planar. In some embodiments, the viewable region of a GUI may be shaped and/or sized to match the planar or non-planar surface of a real-world object in a physical environment or to match the planar or non-planar surface of another graphical element.

Even when a planar viewable region of a GUI is rendered, the video stream rendered on the planar viewable region may be configured to display three-dimensional virtual objects (e.g., to create the illusion of watching a three-dimension television). Three-dimensional virtual objects may be accomplished via simulated stereoscopic 3D content—e.g. watching 3D content from a 3D recording so that content appears in 2D and on the plane of the display, but the user's left and right eyes see slightly different views of the video, producing a 3D effect. In some implementations, playback of content may cause virtual 3D objects to actually leave the plane of the display. For example, a movie where the menus actually pop out of the TV into the user's living room. Further, a frameless GUI may be used to visually present three-dimensional virtual objects from the video stream, thus creating the illusion that the contents of the video stream are playing out in the physical environment.

As another example, the GUI may be rendered in a stationary location relative to real-world objects in the physical environment, or the GUI may be rendered so as to move relative to real-world objects. A stationary GUI may appear to be fixed to a wall, table, or other surface, for example. A stationary GUI may also appear to be floating apart from any real-world objects.

A moving GUI may appear to move in a constrained or unconstrained fashion. For example, a GUI may be constrained to a physical wall, but the GUI may move along the wall as a user walks by the wall. As another example, a GUI may be constrained to a moving object. As yet another example, a GUI may not be constrained to any physical objects and may appear to float directly in front of a user regardless of where the user looks.

In some embodiments, the virtual reality engine may be configured to map a virtual coordinate system to the physical environment such that the GUI appears to be at a particular physical-space location. Furthermore, the virtual coordinate system may be a shared coordinate system useable by one or more other head-mounted display systems. In such a case, each separate head-mounted display systems may recognize the same physical environment location where the GUI is to appear. Each head-mounted display system may then render the GUI at that physical environment location so that two or more users viewing the physical environment location through different see-through graphical displays will see the same GUI in the same place and with the same orientation. In other words, the particular physical-space location at which one head-mounted display system renders a GUI will be the same physical-space location that another head-mounted display systems renders the GUI.

Turning back to FIG. 1, head-mounted display system may optionally include one or more audio speakers 106—e.g., two audio speakers to enable stereo sound effects such as positional audio hints. In other embodiments, the head-mounted display system may be communicatively coupled to an off-board or external audio speaker. In either case, the virtual reality engine may be configured to cause these audio speakers to play an audio stream that is synchronized with a video stream presented at a GUI. For example, while the GUI of FIG. 4 plays a video stream in the form of a television program, an audio speaker may play an audio stream that constitutes the audio component of the television program.

Referring again to FIG. 1, head-mounted display system includes a sensor subsystem 108. The sensor subsystem may include a variety of different sensors in different embodiments. As nonlimiting examples, a sensor subsystem may include a microphone 110, one or more forward-facing (away from user) infrared and/or visible light cameras 112, one or more rearward-facing (towards user) infrared and/or visible light cameras 114. The forward-facing camera(s) may include one or more depth cameras, and/or the rearward-facing cameras may include one or more eye-tracking cameras. In some embodiments, an onboard sensor subsystem may communicate with one or more off-board or external sensors that send observation information to the onboard sensor subsystem. For example, a depth camera used by a gaming console may send depth maps and/or modeled virtual skeletons to the sensor subsystem of the head-mounted display.

The virtual reality engine may be configured to control one or more GUIs responsive to commands recognized via the sensor subsystem. As nonlimiting examples, commands recognized via the sensor subsystem may be used to control GUI creation, GUI positioning (e.g., where and how large GUIs appear); playback controls (e.g., which content is visually presented, fast forward, rewind, pause, etc.); volume of audio associated with a GUI; privacy settings (e.g., who is allowed to see similar instances of the GUI; what such people are allowed to see); screen capture, sending, printing, and saving; and/or virtually any other aspect of a GUI.

As introduced above, a sensor subsystem may include or be configured to communicate with one or more different types of sensors, and each different type of sensor may be used to recognize commands for controlling a GUI. As nonlimiting examples, the virtual reality engine may be configured to control the GUI responsive to audible commands recognized via a microphone, hand gesture commands recognized via a camera, and/or eye gesture commands recognized via a camera.

The types of commands and the way that such commands control the GUIs may vary without departing from the scope of this disclosure. As one example, the location and size of a GUI may be established or changed by recognizing a user tapping on a surface within the physical environment. For example, a user may tap on a planar surface to indicate that the planar surface is the target planar surface for purposes of presenting a GUI and/or receiving user input. As yet another example, a user may speak the command "new monitor," and a GUI may be rendered on a surface towards which eye-tracking cameras determine the user is looking.

Referring again to FIG. 1, head-mounted display system may include one or more features that allow the head-mounted display to be worn on a user's head. In the illustrated example, head-mounted display system takes the form of eye glasses and includes a nose rest 116 and ear rests 118 and 119. In other embodiments, a head-mounted display may include a hat or helmet with an in-front-of-the-face see-through visor. Furthermore, while described in the context of a head-mounted see-through graphical display, the concepts described herein may be applied to see-through graphical displays that are not head mounted (e.g., a windshield) and to displays that are not see-through (e.g., an opaque display that renders real objects observed by a camera with virtual objects not within the camera's field of view).

Head-mounted display system 100 may also include a communication subsystem 120. Communication subsystem 120 may be configured to communicate with one or more off-board or external computing devices. As an example, the communication subsystem may be configured to wirelessly receive a video stream, audio stream, coordinate information, graphical element descriptions, and/or other information to render a GUI.

Figure 5:
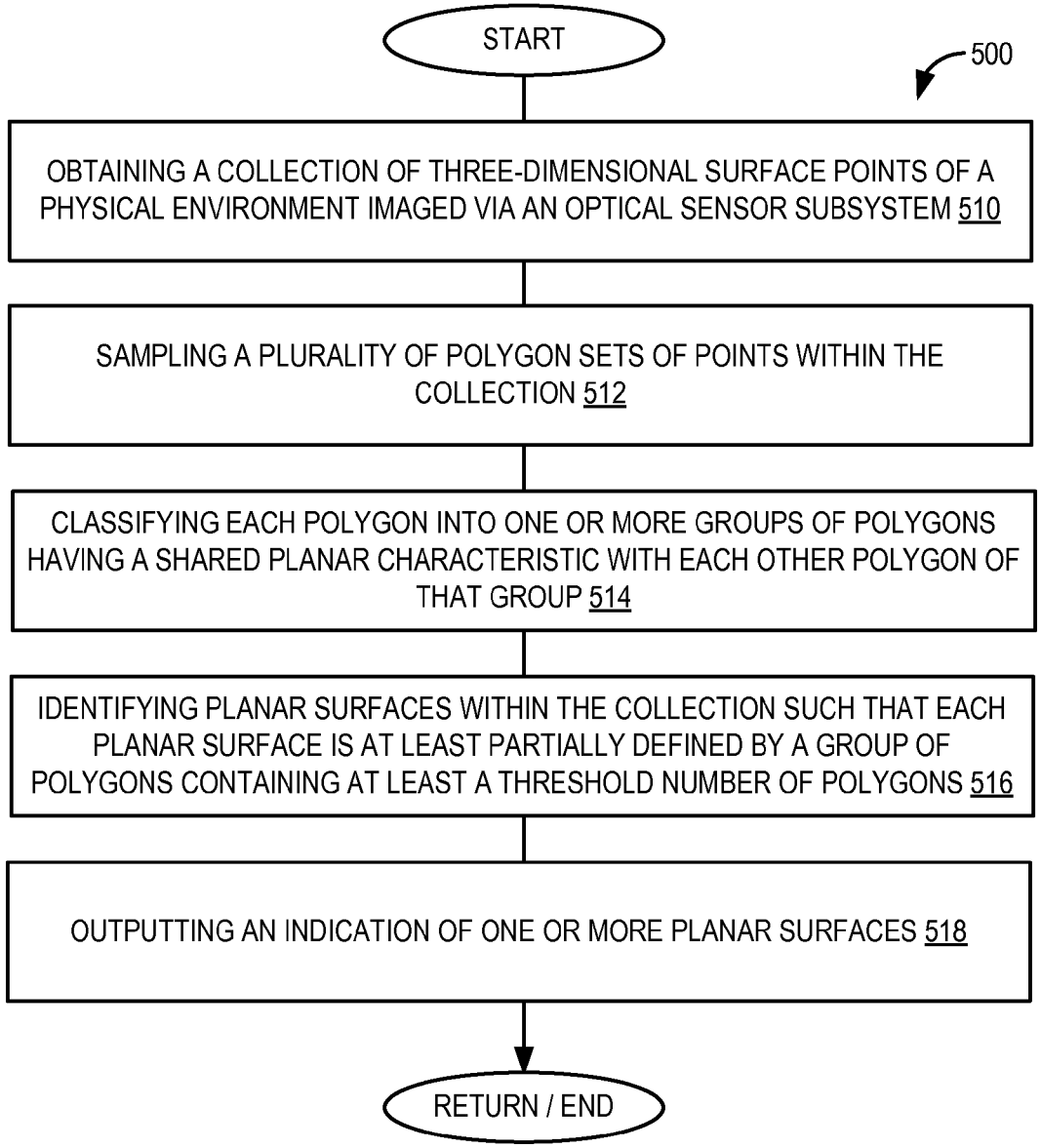
FIG. 5 is a flow diagram depicting an example method 500 for detecting one or more planar surfaces within a physical environment in accordance with an embodiment of the present disclosure.

FIG. 5 is a flow diagram depicting an example method 500 for detecting one or more planar surfaces within a physical environment. Planar surfaces detected using method 500 may be used in the context of method 900 of FIG. 9 to present GUIs overlaying the planar surfaces.

At 510, the method includes obtaining a collection of three-dimensional surface points of a physical environment via an optical sensor subsystem. The collection of three-dimensional surface points may be obtained from one or more optical sensors of the optical sensor subsystem, and may be represented as optical sensor information.

Optical sensor information from two or more optical sensors may be combined to obtain the collection of three-dimensional points using any suitable technique. Non-limiting examples include dense depth reconstructions from stereo, triangulation of sparse appearance-based stereo features, three-dimensional surface reconstructions integrated over time, etc.

As one example, an optical sensor subsystem may include a depth camera that images a physical environment to obtain a depth image that includes the collection of three-dimensional surface points. As another example, an optical sensor subsystem may include two or more depth cameras, each imaging a physical environment to obtain respective depth images which may collectively include or otherwise define the collection of three-dimensional surface points.

In some examples, a collection of three-dimensional surface points may be obtained from an optical sensor subsystem having one or more optical sensors that do not include a depth camera. In this case where the optical sensor information is not a depth image or depth map, the local neighboring structure may be inferred from the optical sensor information for an additional computational cost.

A collection of three-dimensional surface points may refer to a structured or unstructured collection. A structured collection may take the form of three-dimensional surface points having an ordered two-dimensional position within a plane of the depth image (e.g., x, y directions in coordinate space), and a depth (e.g., a z direction in coordinate space). Ordered surface point positions within a depth image may follow a grid structure, polar structure, or other structure. In the context of a depth image, each three-dimensional surface point may take the form of a depth pixel defining a three-dimensional value in three-dimensional physical space. An unstructured collection may include a surface point cloud of three-dimensional surface points. Surface point density may be constant or may vary across a field of view of an optical sensor, and may have a pre-defined density or surface points may be randomly sampled to obtain a random density. At 512, the method includes sampling a plurality of polygon sets of points within the collection. Each polygon set of points includes three or more localized points of the collection defining a polygon. Polygons defined by at least three points are used to identify the depth and/or orientation of physical surfaces within the physical environment, at least in part, because three points represent the minimum quantity of points needed to define a plane within three-dimensional space.

Figure 6:
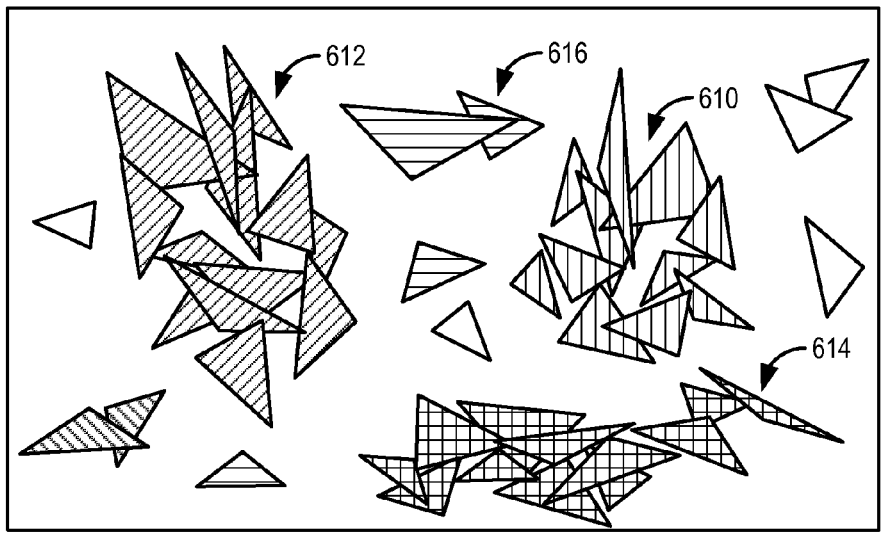
FIG. 6 is an example collection of three-dimensional surface points within which a plurality of polygon sets of points have been sampled.

As a nonlimiting example, each polygon set of points includes three localized points of the collection defining a triangle. However, in other examples, each polygon set of points may include four, five, six, or more points forming other types of polygons. FIG. 6 depicts a nonlimiting example of a plurality of polygon sets of points sampled from a collection.

In at least some implementations, each point may correspond to an individual depth pixel within the collection. In this implementation, each polygon set of points defines a polygon having depth pixels contained within the boundaries of that polygon. Sampled depth pixels and/or polygon sets of points may be spatially partition for faster access using any suitable approach, including use of binary space partitioning, oct-trees, quad-trees, or grids to name just a few examples.

For each polygon set of points, sampling performed at 512 may include randomly sampling a depth value for an initial point of the collection, and sampling two additional depth values for two additional points of the collection. In at least some implementations, a minimum and/or a maximum number of initial points for each polygon set of points may be sampled within defined regions of the collection of three-dimensional surface points to provide a suitable density and uniformity of sampling over the entire collection. However, in some examples, the density of sampling may be greater in defined regions of the collection. For example, a center portion of the collection of three-dimensional surface points may be defined to have a greater density of sampled points than an edge region of the collection.

The two additional points beyond the initial point may each be located within a maximum proximity to the initial point and/or each other. Use of a maximum proximity between two or more points of a polygon set of points may be used to ensure that the points are sufficiently localized. Additionally or alternatively, the two additional points may each be located further than a minimum proximity from the initial point and/or each other. Use of a minimum proximity between two or more points of a polygon set of points may be used to ensure that the points define a polygon spanning a sufficient area or region of the collection. In at least some implementations, minimum and/or maximum proximity may be defined by a human user or a human software developer in the form of a sampling resolution setting, may be defined automatically by an artificial intelligence (AI) algorithm, or may be defined programmatically by an operating system or an application program via an application programming interface (API) command.

At 514, the method includes classifying each polygon into one or more groups of polygons. Each group of polygons may be defined as having a shared planar characteristic with each other polygon of that group and/or a threshold proximity to one or more other polygons of that group.

Figure 7:
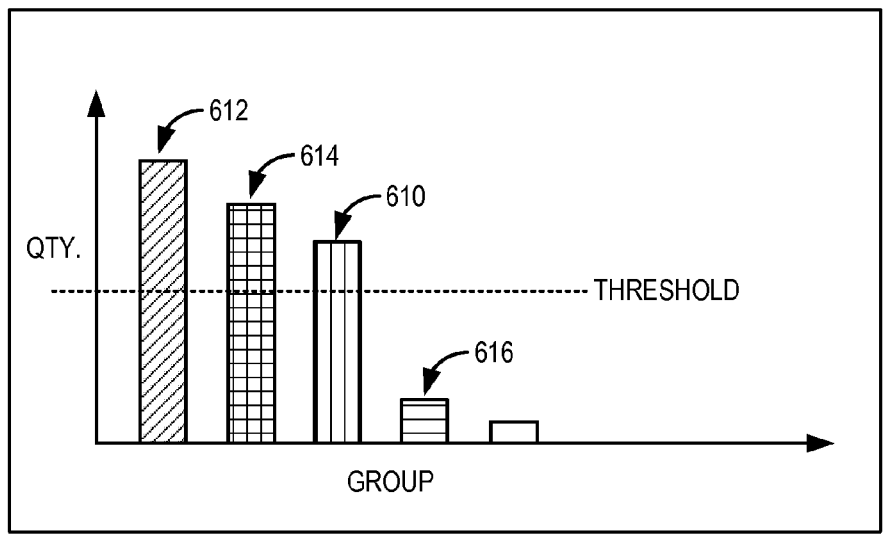
FIG. 7 is an example histogram depicting a quantity of polygons of each group that were present within the collection of FIG. 6.

For each group of polygons, the shared planar characteristic of that group includes a depth and/or an orientation of the polygons of that group defining a common plane within three-dimensional space. As one example, a polygon may be classified as being a member of a group of polygons if the depth and/or orientation of that polygon is within a threshold proximity to the depth and/or orientation of other polygons of that group. Such depths and/or orientations may be analyzed using the combination of a raw Euclidian distance of 4D vector representation of a 3D plane, 3D distance between planes when they are parallel, and/or an angle between normal vectors of respective planes. This threshold may be defined by a human user or a human software developer in the form of a sampling resolution setting, may be defined automatically by an AI algorithm or other suitable algorithm, or may be defined programmatically by an operating system or an application program via an application programming interface (API) command. FIG. 7 depicts a histogram representing a quantity of polygon sets of points classified into specific groups based on the sampling of FIG. 6.

Figure 8:
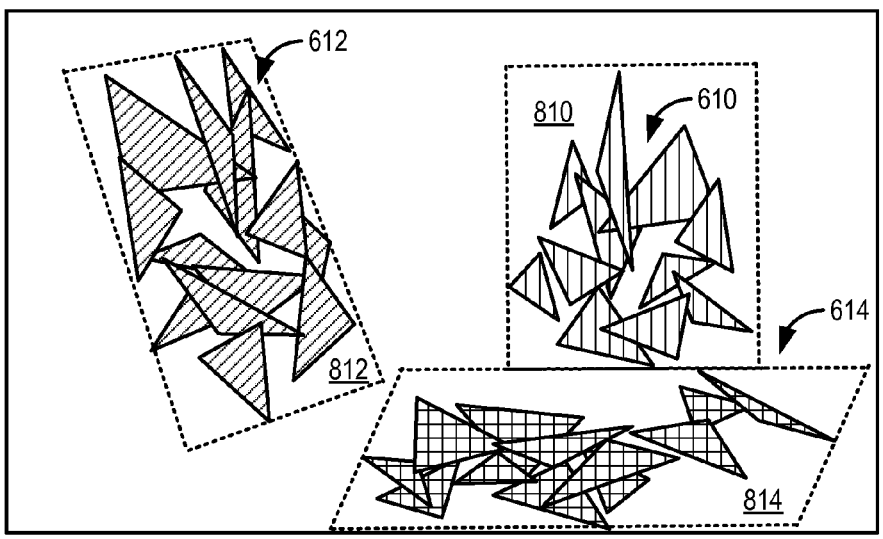
FIG. 8 is the example collection of FIG. 6 within which polygons have been removed which have not being classified as a member of a group having at least the threshold number of member polygons depicted in FIG. 7.

At 516, the method includes identifying one or more planar surfaces within the collection of three-dimensional surface points such that each planar surface is at least partially defined by a group of polygons containing at least a threshold number of polygons. FIG. 8 depicts an example where groups of polygons containing at least the threshold number of polygons represented in FIG. 7 have been filtered from the sampling of FIG. 6 to enable identification of planar surfaces defined by the groups of polygons At 518, the method includes outputting an indication of the one or more planar surfaces. As one example, the indication output at 518 may include a planar surface definition and/or a planar surface identifier for each planar surface identified at 516. As one example, a planar surface definition may include a list or range of pixels of the collection that are contained within a planar surface. As another example, a planar surface definition may include a position, depth, and/or orientation of the planar surface within the collection. A planar surface identifier may include any suitable identifier for distinguishing two or more planar surfaces from each other.

In at least some implementations, the method at 518 may include associating a planar surface definition and/or a planar surface identifier with each planar surface identified at 516. Planar surface definitions and/or identifiers may be output to an application program, operating system, or other suitable functional entity via a programming interface, such as, for example, an API. Planar surface definitions and/or identifiers may be stored at a storage device where they may be later retrieved by an application program, operating system, or other suitable functional entity.

FIG. 6 is an example collection of three-dimensional surface points within which a plurality of polygon sets of points have been sampled. In this particular example, each polygon set of points includes three localized points of the collection defining a triangle. However, in other examples, each polygon set of points may include four, five, six, or more points forming other types of polygons.

Within the example collection of three-dimensional surface points of FIG. 6, each polygon has been classified into a number of groups of polygons in which each group of polygons has a shared planar characteristic with each other polygon of that group. Example groups of polygons are depicted at 610, 612, 614, and 616. Polygons of a particular group (e.g., 610) may have a different planar characteristic than polygons of other groups (e.g., 612, 614, and 616) indicating that the groups of polygons define portions of different planar surfaces within the collection.

Polygons may be classified into any suitable number of groups depending on the geometry of the physical environment that is imaged. Polygons of each group have been depicted in FIG. 6 with a common surface pattern for the purpose of explanation. As may be observed from FIG. 6, groups of polygons 610, 612, and 614 indicated by their respective surface patterns each have more member polygons than group 616.

FIG. 7 is an example histogram depicting a quantity of polygons of each group that were present within the collection of three-dimensional surface points of FIG. 6. For example, group 612 is depicted as having a greater number of polygons than group 614. Group 614 is depicted as having a greater number of polygons than group 610. Group 610 is depicted as having a greater number of polygons than group 616.

FIG. 7 further depicts a threshold number of polygons that may be used to determine whether a particular group of polygons has a sufficient number of member polygons to form a planar surface within the collection. For example, groups 610, 612, and 614 each have a greater number of member polygons than the threshold, whereas group 616 has a lesser number of member polygons than the threshold. Accordingly, groups 610, 612, and 614 may be identified as each defining a respective planar surface within the collection.

FIG. 8 is the example collection of three-dimensional surface points of FIG. 6 within which polygons have been removed which have not being classified as a member of a group having at least the threshold number of member polygons depicted in FIG. 7. For example, polygons that were not classified as being a member of groups 610, 612, and 614 have been excluded from the collection depicted in FIG. 8. The polygons of groups 610, 612, and 614 at least partially define respective planes that are present within the collection of the physical environment.

It will be appreciated that any suitable form of thresholding may be applied to filter polygons, polygon groups, or planar surfaces present within a collection of three-dimensional surface points. The threshold may be varied on an individual collection basis to maintain a minimum and/or a maximum number of planar surfaces within the collection. This threshold may be user defined or may be programmatically defined by an application program, an algorithm (e.g., AI algorithm), operating system, or other suitable functional entity.

FIG. 8 further depicts planar surfaces within a physical environment that are at least partially defined by polygons formed from sampled polygon sets of points. For example, group 610 at least partially defines planar surface 810, group 612 at least partially defines planar surface 812, and group 614 at least partially defines planar surface 814.

Figure 9:
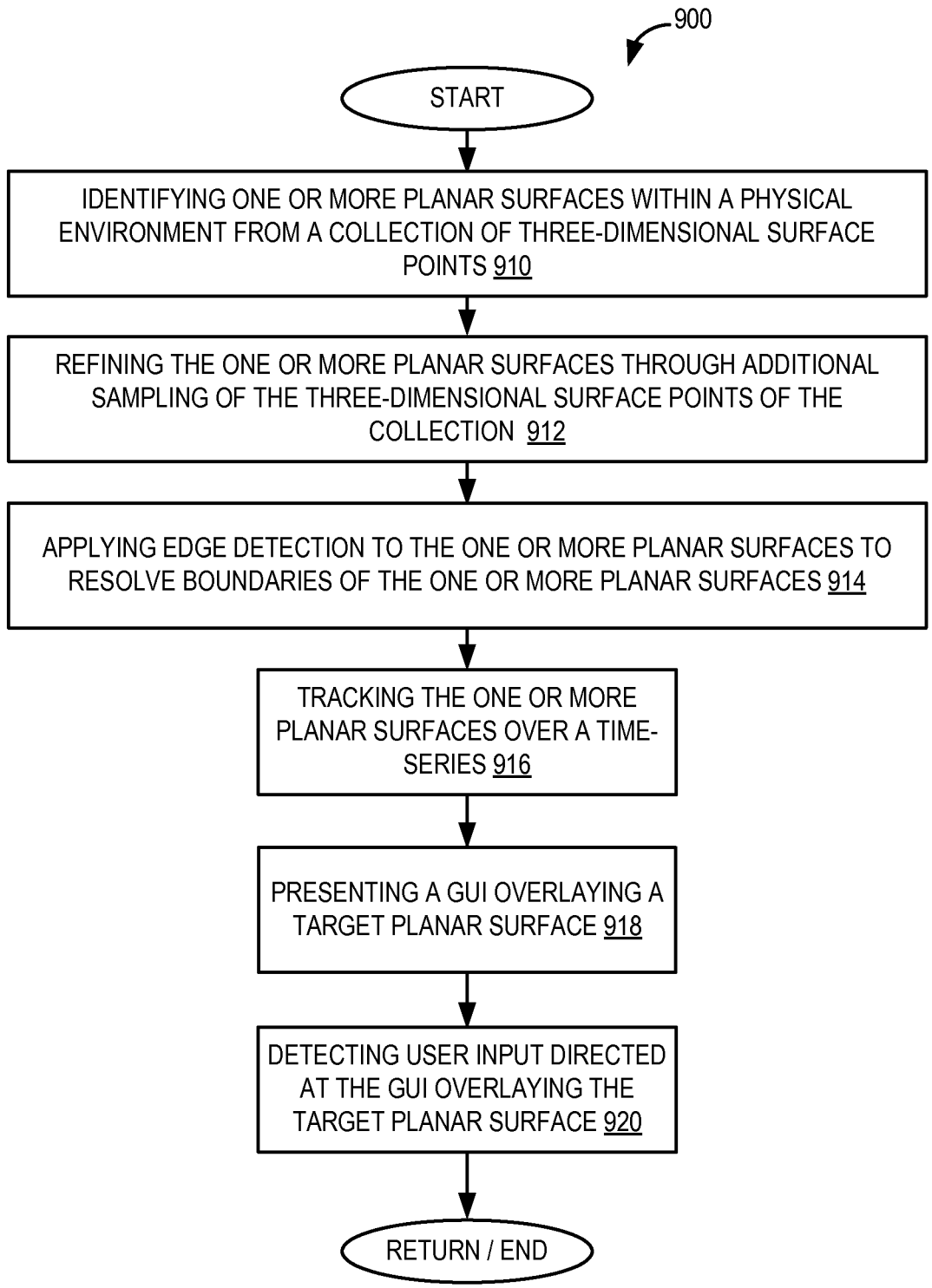
FIG. 9 is a flow diagram depicting an example method of detecting a planar surface within a physical environment and presenting a GUI overlaying that planar surface in accordance with an embodiment of the present disclosure.

FIG. 9 is a flow diagram depicting an example method 900 of detecting a planar surface within a physical environment and presenting a GUI overlaying that planar surface.

At 910, the method includes identifying one or more planar surfaces within a physical environment from a collection of three-dimensional surface points. As one example, previously described method 500 of FIG. 5 may be used to perform initial plane detection for one or more planar surfaces of the physical environment.

Once initial planar surface candidates have been identified, the initial planar surfaces may be optionally refined. A variety of techniques may be used to refine the initial planar surfaces. Such refining may be implemented based on or responsive to the computational budget and/or accuracy needs of a user, application program, operating system, or other functional entity.

At 912, the method includes refining the one or more planar surfaces through additional sampling of the collection of three-dimensional surface points. The additional sampling of the collection may be primarily or entirely focused within the regions of the collection containing the one or more planar surfaces identified at 910. Additionally or alternatively, plane "closeness" thresholds for classifying groups of polygons may be reduced to further reduce the quantity of planar surfaces and reduce polygon grouping membership. These refinement techniques may provide a more accurate definition of the planar surfaces present within the physical environment. However, use of these refinement techniques may be limited to maintain computational budget, detection accuracy, and/or to ensure that at least one planar surface remains after refinement.

As one example, one or more planar surfaces may be refined within the collection by resampling a second plurality of polygon sets of points within that collection. Each polygon set of points of the second plurality of polygon sets of points may include three or more localized points of the collection defining a polygon with at least one point of that polygon being located within the one or more planar surfaces or within a threshold proximity to the one or more planar surfaces. Hence, resampling of the collection may be limited to regions containing the one or more planar surfaces.

The resampled collection of three-dimensional surface points may be processed using similar techniques applied at 910 and as previously described with reference to method 500 of FIG. 5. For example, each polygon of the second plurality of polygon sets of points may be classified into the one or more groups of polygons identified from a previous sampling of the collection. Furthermore, each planar surface within the collection may be further defined by a group of polygons having at least a threshold number of polygons from both the plurality of polygon sets of points and the second plurality of polygon sets of points. An indication of the one or more planar surfaces that satisfy the threshold number of polygons criteria after resampling may be output for use in the presentation of a GUI, for example.

Refining of planar surfaces within a collection of three-dimensional surface points may be performed by resampling the collection one, two, three, or other suitable number of times to further improve planar surface resolution or understanding. Through such resampling, the minimum and/or maximum proximity of points resampled for a given polygon set of points may be increased or decreased relative to a previous sampling of the collection. For example, the minimum and maximum proximity may be reduced during resampling to obtain a finer resolution of the collection in the region of the most prominent planar surfaces initially identified at 910.

In at least some implementations, refining of planar surfaces within a collection of three-dimensional surface points may be performed without resampling. For example, proximity of initially sampled points or polygon groups of points to their associated planar surface may be reduced to exclude one or more of such points. As one example, a covariance matrix of the set of points, that are within a threshold to the initial plane estimation, may be calculated. A singular value decomposition of the covariance matrix may be performed in which case the normal to the plane is given by the eigenvector corresponding to the lowest eigenvalue.

At 914, the method includes applying edge detection to the one or more planar surfaces to resolve the boundaries of the one or more planar surfaces. Edge detection may be performed iteratively in some examples. Edge detection may be applied to all sampled points within a threshold of a planar surface.

As described by way of example with reference to FIGS. 10-13, edge detection may be performed by first getting a depth sample set that is within a threshold of a detected plane. Then one or more iterations of hole filling, erosion, and/or dilation may be performed. In hole filling, one or more holes within an outer boundary of a detected plane may be filled to more closely match surrounding neighboring pixels. In erosion, the outer edge of the detected plane may be contracted so as to smooth the edge. In dilation, the outer edge of the detected plane may be expanded so as to recover any plane that may have been lost during erosion. Next, connected component analysis may be used to find candidate planes having at least a threshold size. Each of the candidates that satisfies this threshold is identified as a separate plane, and the edge of that candidate is identified as the edge of the plane.

FIGS. 10-13 are schematic diagrams depicting an example of edge detection applied to depth pixel data. In FIGS. 10-13, an example 10×10 block of depth pixels are shown for an edge portion of an example planar surface. The edge portion of the planar surface is depicted in FIGS. 10-13 with a broken line. Within each of FIGS. 10-13, individual depth pixels are shown with a cross-hatch surface pattern if those depth pixels have been classified as forming part of the planar surface. Depth pixels that are not shown with the cross-hatch surface pattern have not been classified as forming part of the planar surface.

Figure 10:
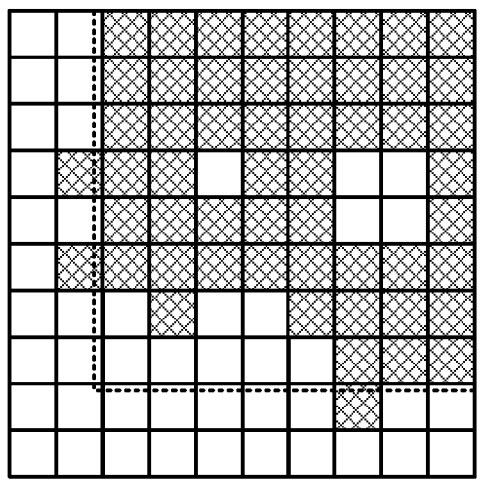
FIGS. 10-13 are schematic diagrams depicting an example of edge detection applied to depth pixel data in accordance with an embodiment of the present disclosure.

FIG. 10 shows raw depth pixel data obtained from a collection of three-dimensional surface points. As may be observed from FIG. 10, some depth pixels classified as forming part of the planar surface initially reside outside of the planar surface, and some depth pixels classified as not forming part of the planar surface initially reside within the planar surface.

Figure 11:
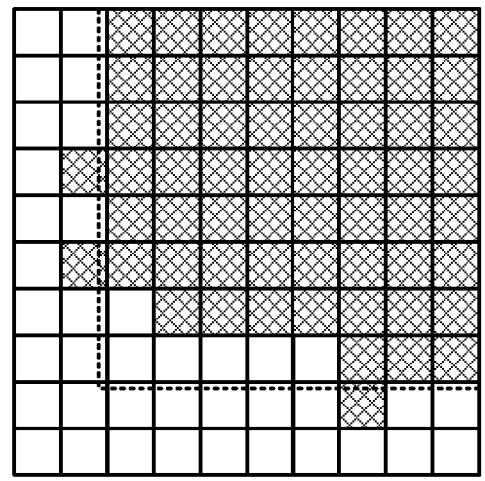
Figure 12:
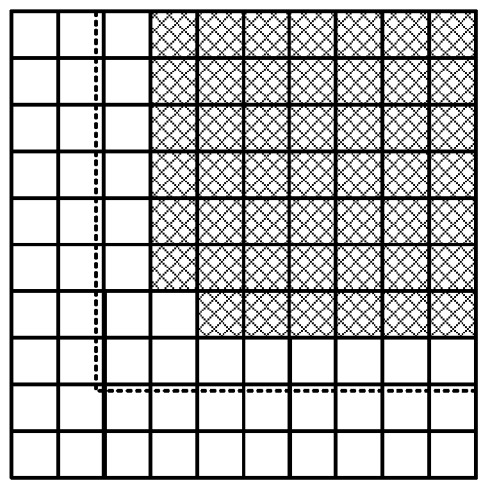
Figure 13:
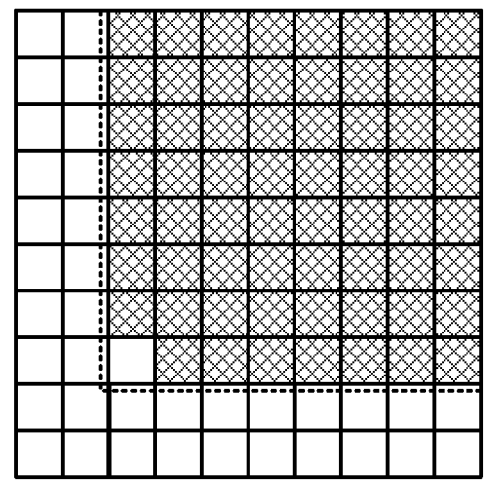

FIG. 11 shows processed depth pixel data from FIG. 10 in which holes are filled in the planar surface formed by depth pixels initially classified as not forming part of the planar surface, and have been reclassified as forming part of the planar surface over one or more iterations. FIG. 12 shows processed depth pixel data from FIG. 11 in which edge erosion of the planar surface has been applied over one or more iterations to reclassify one or more depth pixels as not forming part of the planar surface that were previously classified as forming part of the planar surface. FIG. 13 shows processed depth pixel data from FIG. 12 in which dilation has been applied over one or more iterations to reclassify one or more depth pixels as forming part of the planar surface that were previously classified as not forming part of the planar surface.

Returning to FIG. 9, at 916, the method includes tracking the one or more planar surfaces over a time-series of three-dimensional surface point collections. A planar surface may appear to be moving within a time-series of collections due to relative movement of the optical sensor subsystem relative to the physical environment. For example, the collection processed through application of method 500 of FIG. 5 or at 910, 912, and 914 of FIG. 9 may be one of a plurality of three-dimensional surface point collections of the physical environment imaged via an optical sensor subsystem in a time-series. Movement within the time-series may include translation and/or rotation of the planar surfaces in one or more directions within three-dimensional space. Changes to the planar surface definitions including transformations (e.g., rotation and/or translation) and/or planar surface identities between time-series collections may be tracked so that GUIs overlaying these planar surfaces are maintained in proper alignment and registration throughout the time-series.

In the context of method 900, the term "target planar surface" may be used to refer to a subset of planar surfaces within the physical environment that are the subject of tracking, presentation of a GUI, or detection of a user input through application of processes 916, 918, and/or 920. It will be understood that a single target planar surface or multiple target planar surfaces may be identified from a given set of planar surfaces that have been detected within a physical environment. As one example, a target planar surface may include the greatest number of polygons having the shared planar characteristic of the set of planar surfaces.

Identification of one or more target planar surfaces may be used to reduce computational load by reducing the number of planar surfaces that are actively tracked between frames of optical sensor information. In at least some implementations, an indication of a target planar surface may be received from an application program or from an operating system via an API. An indication of a target planar surface may also be received from a user selection of the target planar surface from a set of planar surfaces detected within a physical environment. The indication of the target planar surface, including a planar surface definition and/or a planar surface identity may be stored in a storage subsystem where it may be retrieved to implement aspects of method 900.

A target planar surface that has moved through translation or rotation between a plurality of three-dimensional surface point collections may be tracked to enable a reduction in sampling resolution, processing time and/or processing resources of one or more collections following a previously sampled collection. As one example, tracking may be performed by identifying a distance between one or more points of the target planar surface in a first collection and a second collection. The one or more points in the first collection may be matched to the one or more points in the second collection if the distance between the one or more points in the first collection and second collection is less than a threshold distance.

Tracking may be achieved in some implementations by computing a match score for the target planar surface between two or more frames of optical sensor information. For example, a match score may be computed as a bipartite matching for the planar surface between the two or more frames. A match score between processed three-dimensional surface point collections for a target planar surface may be calculated by weighing and/or combining one or more of the following: (1) a distance between the center of the edges of the planar surface between two frames, (2) an edge shape match as identified by an Iterative Closest Point (ICP) of the edges of the target planar surface between two frames, (3) the average distance of one or more edge pixels of the target planar surface of a previous frame to the closest edge pixel of a subsequent frame, (4) surface features present within infrared and/or visible light images that are aligned in time and/or space with the collections.

Depending on performance requirements and computational budget, not all points may be matched between time-series depth-images. In some examples, defined number of points within minimum and maximum bounds may be matched to limit or otherwise manage the computational load. Matching may be performed with more iterations of ICP in which an average edge distance score can be calculated between time-series frames for a given set of points of a target planar surface. During this process, a delta transformation value may be calculated between the planar surface from a previous frame and the planar surface of the subsequent frame of the optical sensor information for the given set of points.

Additionally or alternatively, tracking may be performed by identifying surface features in the target planar surface from first and second visible light and/or infrared images that are registered in time and space with the first and second collections, respectively. For example, an optical sensor subsystem may image the physical environment to obtain visible light and/or infrared images while obtaining three-dimensional surface point collections of the physical environment. Surface features in the target planar surface may enable or improve matching of points within a target planar surface between two or more visible light and/or infrared images.

A planar surface that has been tracked across two or more time-series three-dimensional surface point collections may be associated with a common planar surface identifier to consistently represent that planar surface to other functional entities. For example, a planar surface present within each of a first collection and a second collection (or other subsequent collection) may be associated with a common planar surface identifier if the surface features in the first and second visible light and/or infrared images have a shared surface feature characteristic, and/or if a distance between one or more points in the first collection and second collection are less than a threshold distance.

At 918, the method includes presenting a GUI overlaying a target planar surface of the one or more planar surfaces. In at least some implementations, the GUI overlaying a target planar surface may be contained within the boundaries of the target planar surface. In at least some implementations, the boundaries of the GUI may be sized and/or shaped to substantially match the boundaries of the target planar surface. In this implementation, the GUI may simulate a virtual tablet computer in which the target planar surface is capable of providing tactile feedback to the user, such as provided by a traditional tablet computer.

As one example, a GUI overlaying at least a portion of a target planar surface may be presented via a display subsystem. The display subsystem may take the form of or may include a see-through graphical display of a head-mounted display system, or a graphical display of a mobile computing device that presents a camera view of the physical environment.

As another example, a GUI overlaying at least a portion of the target planar surface may be presented by projecting visible light onto the target planar via a display subsystem. In this implementation, the display subsystem includes a projector capable of projecting visible light representing the GUI onto the target planar surface within the physical environment.

At 920, the method includes detecting a user input directed at the GUI overlaying the target planar surface. A user input directed at a graphical selector of the GUI may be detected from one or more collections of three-dimensional surface points of the target planar surface. The user input may be detected based on at least partial occlusion of the target planar surface by an object (e.g., a body portion of the user, such as a finger, hand, or other suitable pointing device) and/or a depth of the object relative to the target planar surface within the one or more collections. One or more of these collections may be obtained in a time-series subsequent to a previous collection that was used to detect a planar surface upon which the GUI was presented.

A user input may be defined by the occurrence of a touch event at the planar surface by an object. The touch event may be detected using a variety of techniques. As one example, centroids of finger or hand body portions may be detected, segmented from the background collection of three-dimensional surface points, and measured in relation to the depth of the planar surface.

As one example, an object may be sampled within a collection to obtain a depth of the object relative to the target planar surface. An indication of a touch condition representing the user input may be output responsive to the depth of the object relative to a depth of the target planar surface being less than a threshold. However, other suitable techniques may be used to determine whether a user input has been directed at the GUI.

In at least some embodiments, the above described methods and processes may be tied to a computing system including one or more computers. In particular, the methods and processes described herein may be implemented as a computer application, computer service, computer API, computer library, and/or other computer program product.

Figure 14:
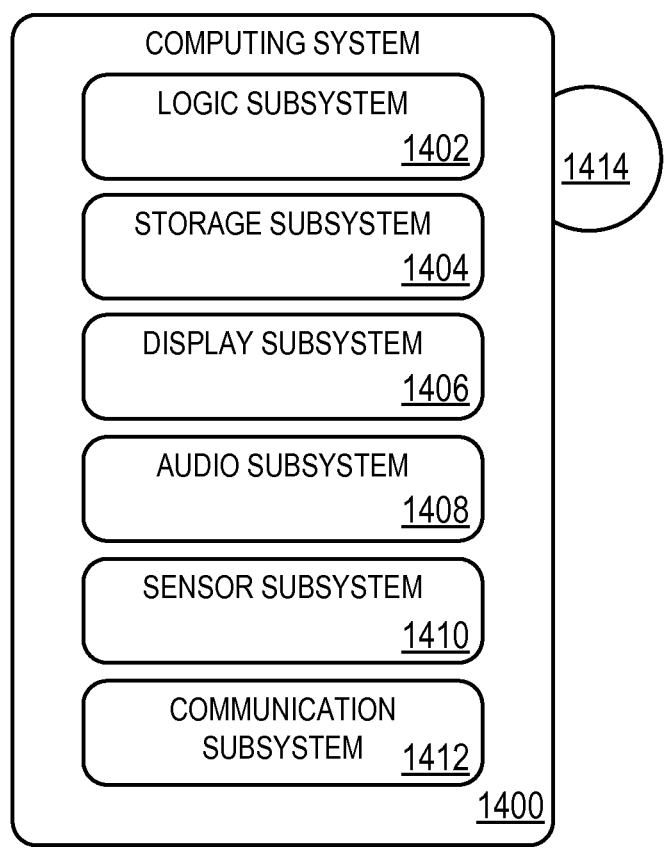
FIG. 14 is an example computing system in accordance with an embodiment of the present disclosure.

FIG. 14 schematically shows a nonlimiting computing system 1400 that may perform one or more of the above described methods and processes. Computing system 1400 is shown in simplified form. It is to be understood that virtually any computer architecture may be used without departing from the scope of this disclosure. In different embodiments, computing system 1400 may take the form of a mainframe computer, server computer, desktop computer, laptop computer, tablet computer, home entertainment computer, network computing device, mobile computing device, mobile communication device, gaming device, etc.

Computing system 1400 includes a logic subsystem 1402 and a storage subsystem 1404. Computing system 1400 may optionally include a display subsystem 1406, audio subsystem 1408, sensor subsystem 1410, communication subsystem 1412, and/or other components not shown in FIG. 14. Computing system 1400 may also optionally include user input devices such as keyboards, mice, game controllers, cameras, microphones, and/or touch screens, for example.

Logic subsystem 1402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1404 includes one or more physical, non-transitory, devices configured to hold data and/or instructions executable by the logic subsystem to implement the herein described methods and processes. When such methods and processes are implemented, the state of storage subsystem 1404 may be transformed (e.g., to hold different data).

Storage subsystem 1404 may include removable media and/or built-in devices. Storage subsystem 1404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1404 may include devices with one or more of the following characteristics: volatile, nonvolatile, dynamic, static, read/write, read-only, random access, sequential access, location addressable, file addressable, and content addressable. In some embodiments, logic subsystem 1402 and storage subsystem 1404 may be integrated into one or more common devices, such as an application specific integrated circuit or a system on a chip.

FIG. 14 also shows an aspect of the storage subsystem in the form of removable computer-readable storage media 1414, which may be used to store and/or transfer data and/or instructions executable to implement the herein described methods and processes. Removable computer-readable storage media 1414 may take the form of CDs, DVDs, HD-DVDs, Blu-Ray Discs, EEPROMs, and/or floppy disks, among others.

It is to be appreciated that storage subsystem 1404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 1400 that is implemented to perform one or more particular functions. In some cases, such a module, program, or engine may be instantiated via logic subsystem 1402 executing instructions held by storage subsystem 1404. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 1406 may be used to present a visual representation of data held by storage subsystem 1404. As the herein described methods and processes change the data held by the data-holding subsystem, and thus transform the state of the data-holding subsystem, the state of display subsystem 1406 may likewise be transformed to visually represent changes in the underlying data. Display subsystem 1406 may include one or more display devices utilizing virtually any type of technology. Such display devices may be combined with logic subsystem 1402 and/or storage subsystem 1404 in a shared enclosure, or such display devices may be peripheral display devices.

As one example, display subsystem 1406 may include or take the form of a projector that is configured to project visible light onto a physical surface. As another example, display subsystem 1406 may include or take the form of a graphical display, such as a see-through graphical display of a head-mounted display system or a graphical display of a mobile computing device. It will be understood that display subsystem 1406 may take other forms beyond these examples.

Sensor subsystem 1410 may include one or more optical sensor subsystems including one or depth cameras, infrared and/or visible light cameras. Sensor subsystem 1410 may include other suitable sensors, including microphones, inertial sensors, etc. In some embodiments, sensor subsystem 1410 may communicate with one or more external sensors that send observation information to the sensor subsystem. External sensors may include the previously described optical sensor subsystem, for example.

When included, communication subsystem 1412 may be configured to communicatively couple computing system 1400 with one or more other computing devices. Communication subsystem 1412 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 1400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for detecting one or more planar surfaces within a physical environment, the method comprising:
   obtaining a collection of three-dimensional surface points of a physical environment via an optical sensor subsystem;
   sampling a plurality of polygon sets of points within the collection, each polygon set of points including three or more localized points of the collection defining a polygon;
   classifying each polygon into one or more groups of polygons, each group of polygons having a shared planar characteristic with each other polygon of that group, the shared planar characteristic including a depth and/or an orientation of the polygons of that group;
   identifying one or more planar surfaces within the collection such that each planar surface is at least partially defined by a group of polygons containing at least a threshold number of polygons.

2. The method of claim 1, wherein each polygon set of points includes three localized points of the collection defining a triangle; and
   wherein sampling the plurality of polygon sets of points includes, for each polygon set of points:
   sampling a depth value for an initial point of the collection, and
   sampling two additional depth values for two additional points of the collection, the two additional points each located within a maximum proximity to the initial point and located further than a minimum proximity from the initial point.

3. The method of claim 1, further comprising:
   presenting via a display subsystem, a graphical user interface overlaying at least a portion of a target planar surface of the one or more planar surfaces; and
   detecting a user input directed at a graphical selector of the graphical user interface, the user input detected based on at least partial occlusion of the target planar surface by an object and/or a depth of the object relative to the target planar surface within one or more collections;
   wherein the display subsystem includes a see-through graphical display of a head-mounted display system or a graphical display of a mobile computing device that presents a camera view of the physical environment.

4. The method of claim 1, further comprising:
   projecting visible light onto a target planar surface of the one or more planar surfaces via a display subsystem, the visible light including a graphical user interface overlaying at least a portion of the target planar surface; and detecting a user input directed at a graphical selector of the graphical user interface from a subsequent collection of three-dimensional surface points of the target planar surface, the user input detected based on at least partial occlusion of the target planar surface by an object and/or a depth of the object relative to the target planar surface within the subsequent collection.

5. The method of claim 1, further comprising:
refining the one or more planar surfaces by resampling a second plurality of polygon sets of points that are within a threshold of an initially identified plane, each polygon set of points of the second plurality of polygon sets of points including three or more localized points of the depth image defining a polygon; and
classifying each polygon of the second plurality of polygon sets of points into the one or more groups of polygons;
wherein each planar surface is further defined by a group of polygons having at least a threshold number of polygons from both the plurality of polygon sets of points and the second plurality of polygon sets of points.

6. The method of claim 1, wherein each point corresponds to a depth pixel within the collection, and wherein each polygon set of points defines a polygon having depth pixels contained within the boundaries of that polygon forming part of a planar surface.

7. The method of claim 6, further comprising detecting an edge of the one or more planar surfaces.

8. The method of claim 7, where detecting an edge includes one or more of hole filling, erosion, and dilation.

9. The method of claim 8, further comprising:
eliminating a planar surface from the one or more planar surfaces if that planar surface contains less than a threshold number of depth pixels after reclassifying the one or more depth pixels to smooth edges of the one or more planar surfaces.

10. The method of claim 9, wherein tracking the target planar surface further comprises:
identifying surface features in the target planar surface from first and second visible light and/or infrared images registered in time and space with the first and second collections, respectively; and
associating the planar surface in each of the first collection and the second collection with a common planar surface identifier if the surface features in the first and second visible light and/or infrared images have a shared surface feature characteristic.

11. The method of claim 1, wherein the collection of three-dimensional surface points of the physical environment is one of a plurality of collections of three-dimensional surface points of the physical environment imaged via the optical sensor subsystem in a time-series; and
wherein the method further comprises tracking a target planar surface of the one or more planar surfaces that has moved between the plurality of collections by:
identifying a distance between one or more points of the target planar surface in a first collection and a second collection of the plurality of collections, and
matching the one or more points in the first collection to the one or more points in the second collection if the distance between the one or more points in the first collection and second collection is less than a threshold distance.

12. The method of claim 11, further comprising:
associating the target planar surface in each of the first collection and the second collection with a common planar surface identifier if the distance between the one or more points in the first collection and second collection is less than the threshold distance.

13. The method of claim 1, further comprising:
outputting a planar surface identifier for each identified planar surface via an application programming interface.

14. The method of claim 1, further comprising:
receiving an indication of a target planar surface of the one or more planar surfaces from an application program via an application programming interface; and
presenting a graphical user interface overlaying at least a portion of the target planar surface indicated by the application program, the graphical user interface contained within the boundaries of the target planar surface.

15. A storage subsystem holding instructions executable by a logic subsystem to:
obtain a collection of three-dimensional surface points of a physical environment imaged via an optical sensor subsystem;
sample a plurality of polygon sets of points within the collection, each polygon set of points including three or more localized points of the collection defining a polygon;
classify each polygon into one or more groups of polygons, each group of polygons having a shared planar characteristic with each other polygon of that group;
identify one or more planar surfaces within the collection such that each planar surface is at least partially defined by a group of polygons containing at least a threshold number of polygons; and
present a graphical user interface overlaying at least a portion of a target planar surface of the one or more planar surfaces, the graphical user interface contained within the boundaries of the target planar surface.

16. The storage subsystem of claim 15, wherein the instructions are further executable to:
refine the one or more planar surfaces by resampling a second plurality of polygon sets of points that are within a threshold of an initially identified plane, each polygon set of points of the second plurality of polygon sets of points including three or more localized points of the depth image defining a polygon; and
classify each polygon of the second plurality of polygon sets of points into the one or more groups of polygons;
wherein each planar surface is further defined by a group of polygons having at least a threshold number of polygons from both the plurality of polygon sets of points and the second plurality of polygon sets of points.

17. The storage subsystem of claim 16, wherein the instructions are further executable to detect an edge of the one or more planar surfaces.

18. The storage subsystem of claim 17, wherein the collection of three-dimensional surface points of the physical environment is one of a plurality of collections of three-dimensional surface points of the physical environment imaged via the optical sensor subsystem in a time-series; and
wherein the instructions are further executable to:
track a target planar surface of the one or more planar surfaces that has moved between the plurality of collections by:
identifying a distance between one or more points of the target planar surface in a first collection and a second collection of the plurality of collections, and
matching the one or more points in the first collection to the one or more points in the second collection if the distance between the one or more points in the first collection and second collection is less than a threshold distance.

19. A head-mounted display system, comprising:

a see-through graphical display configured to visually augment an appearance of a physical environment to a user viewing the physical environment through the see-through graphical display, an optical sensor subsystem configured to image the physical environment; and a computing device configured to:
  obtain a collection of three-dimensional surface points of the physical environment imaged via the optical sensor subsystem;
  sample a plurality of polygon sets of points within the collection, each polygon set of points of the plurality including three or more localized points of the collection defining a polygon;
  classify each polygon into one or more groups of polygons, each group of polygons having a shared planar characteristic with each other polygon of that group;
  identify one or more planar surfaces within the collection such that each planar surface is at least partially defined by a group of polygons containing at least a threshold number of polygons; and
  present a graphical user interface overlaying at least a portion of a target planar surface of the one or more refined planar surfaces, the graphical user interface contained within the boundaries of the target planar surface.

* * * * *